F. A. LAWTON.
WIND SHIELD.
APPLICATION FILED JUNE 18, 1912.

1,083,108.

Patented Dec. 30, 1913.

2 SHEETS—SHEET 1.

Inventor
F. A. Lawton.

Witnesses
William S. Smith
R. M. Smith

By Victor J. Evans
Attorney

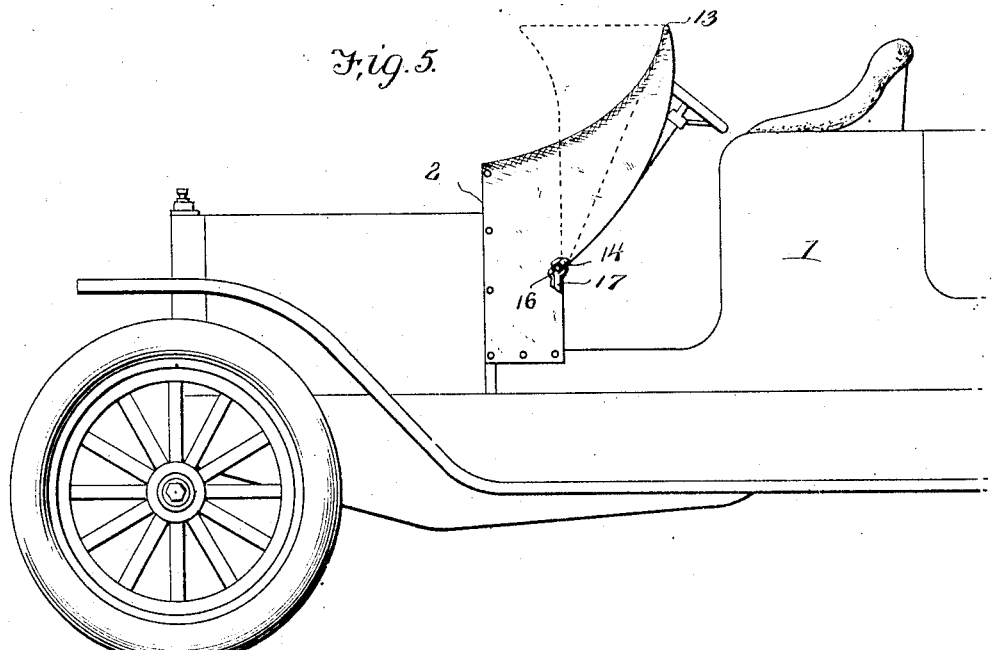
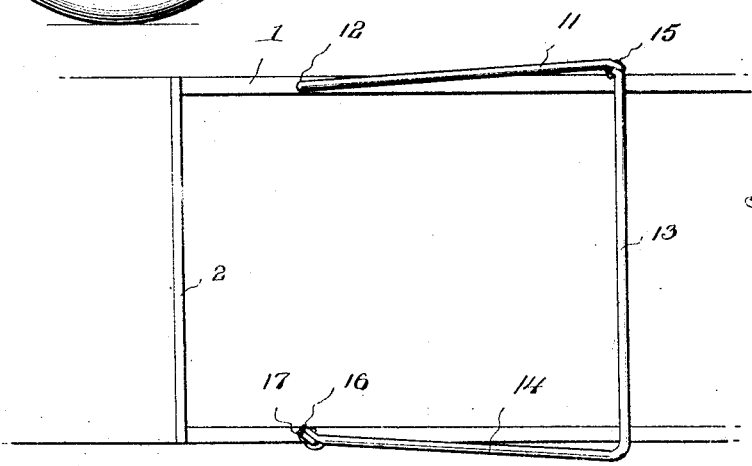
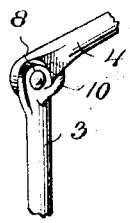

UNITED STATES PATENT OFFICE.

FRED A. LAWTON, OF LUNENBURG, MASSACHUSETTS.

WIND-SHIELD.

1,083,108.  Specification of Letters Patent.  Patented Dec. 30, 1913.

Application filed June 18, 1912. Serial No. 704,337.

*To all whom it may concern:*

Be it known that I, FRED A. LAWTON, a citizen of the United States, residing at Lunenburg, in the county of Worcester and State of Massachusetts, have invented new and useful Improvements in Wind-Shields, of which the following is a specification.

This invention relates to wind shields for self-propelled vehicles, the object in view being to provide a sectional and folding wind shield, having a section or sections thereof arranged so that they may be moved toward and away from the seat, and in an oblique path toward and away from the longitudinal axis of the vehicle body, thereby adapting ready access to be had to the seat or seats of the machine, and also to the floor of the vehicle body, and the parts located beneath the same, and also to the dash-board and the parts mounted thereon.

With the above and other objects in view, the invention consists in the construction, combination and arrangement of parts, as will be hereinafter more fully described, illustrated in the accompanying drawings, and pointed out in the claim hereunto appended.

Figure 1:
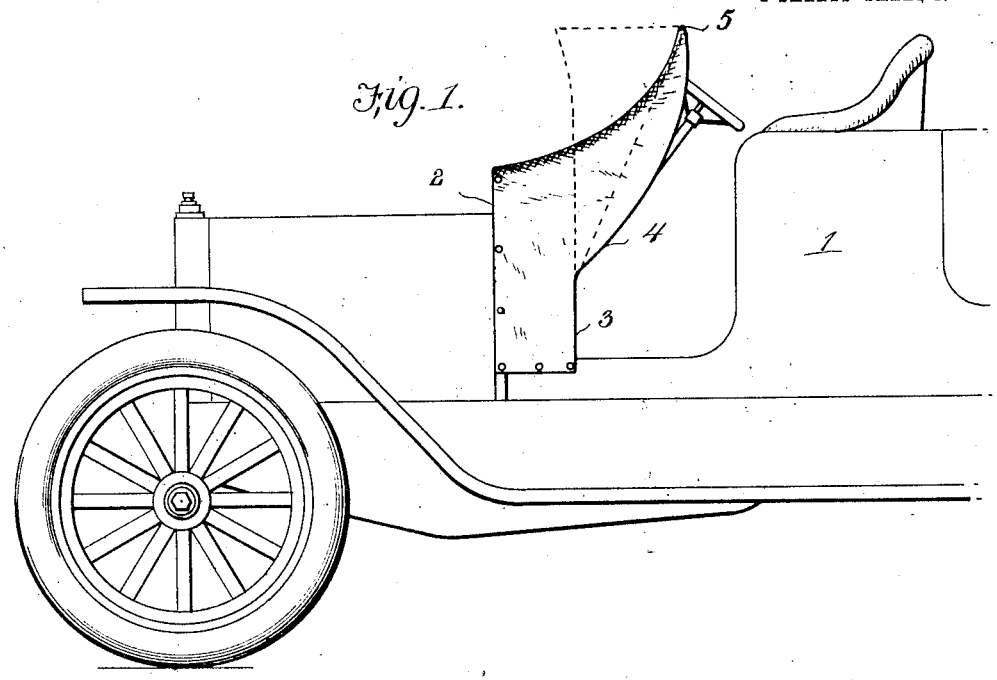
Figure 2:
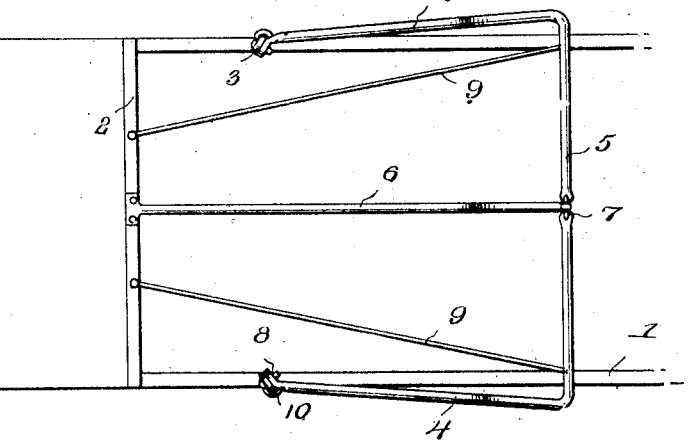
Figure 4:
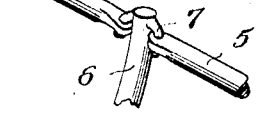

In the drawings: Figure 1 is a side elevation of the front portion of an automobile, showing the improved wind shield applied thereto, and illustrating the normal position of the wind shield in full lines, and the folded position thereof in dotted lines. Fig. 2 is a plan view of the same. Fig. 3 is a detail perspective view of one of the lower hinged joints. Fig. 4 is a similar view of the upper hinged joint. Fig. 5 is a side elevation, similar to Fig. 1, showing a slightly modified form of wind shield. Fig. 6 is a plan view of the same.

Referring to the drawings, 1 designates the forward portion of an automobile body, 2 representing the usual dash arranged just back of the motor.

In carrying out the present invention, I provide two vertical posts 3, extending up from the opposite sides of the body, to which the movable sections of the wind shield are connected, so as to swing on an oblique axis.

In the preferred embodiment of the invention, I provide two hinged sections, each of which comprises the upwardly curving and rearwardly extending side bars 4, and the substantially horizontal and inwardly extending top bar sections 5. In addition to the two sections just referred to, the wind shield comprises a central brace 6, the forward end of which is connected to the dash board in any convenient manner, and the rear upwardly curving terminal portion of which is provided with the inclined or obliquely disposed pintles 7, upon which the inner ends of the top bar sections 5 are journaled, by providing said bars with eyes to receive the pintles. Each top bar section 5 is formed integrally with the adjoining side bar 4, as shown in Fig. 2, thereby forming an L-shaped or two-sided stretcher for the cover.

At their lower and forward extremities, the side bars 4 are connected to the tops of the posts 3 by obliquely disposed pintles 8 which are in the same line with the pintles 7, above referred to, and it will now be observed that by taking hold of the upper outer corner of one of the hinged sections of the wind shield frame, said section may be swung forward away from the seat in an oblique path toward the longitudinal center of the vehicle body. In other words, each hinged section of the wind shield frame is adapted to be moved toward and away from the seat, in a path oblique to the longitudinal axis of the vehicle body.

When the hinged sections of the wind shield are in the position illustrated by full lines in Fig. 1, for example, they constitute an admirable support and stretcher for the body or covering of the wind shield, which is of a flexible nature, and when swung forward in the manner indicated, they are not in the way, and therefore admit of the ready entrance or exit of the occupant of the seat adjacent to the folding section or sections of the shield. Furthermore, by folding the wind shield in the manner described, convenient access may be had to the floor or dash of the vehicle, for inspection or repair purposes.

9 designates flexible stays connected at one end to the dash, and at their opposite ends to the top bars of the wind shield sections, so as to limit the backward movement of the hinged sections. As a further preventive of the hinged sections swinging back too far, a restraining metal loop 10 or other stop is provided on the top of each of the posts 3, against which the side bars of the hinged section rest, when thrown back. The fabric with which the wind shield frame is covered may consist of any well-known material, such as celluloid or some like substance, which is capable of flexing to accommodate the swinging movements of the hinged sections of the wind shield frame.

The wind shield frame, hereinabove described and illustrated in Figs. 1 and 2, comprises two hinged sections, so as to permit a person to readily enter the vehicle from either side. Where it is desired to enter the vehicle from one side only, the construction illustrated in Figs. 5 and 6 may be resorted to, wherein it will be observed that the stationary section of the wind shield comprises a stationary side bar 11, having an integrally formed post 12 secured to one side of the vehicle body. The entire top bar 13 and the remaining side bar 14 are formed in one piece, and this constitutes the swinging part of the wind shield frame, the same being permanently connected, at 15, to the upper extremity of the arm 11, and also pivotally connected, at 16, to the upper extremity of the post 17 at the opposite side of the vehicle body. This last-named wind shield frame is covered with the same flexible fabric that has been referred to in connection with the frame illustrated in Figs. 1 and 2.

What is claimed is:

A wind shield comprising a frame embodying a rearwardly inclined stationary bar, means for rigidly fastening the front extremity of said bar to the machine frame in front of the plane of the seat, a rigid side post, an L-shaped stretcher formed in one piece embodying a rearwardly inclined side bar and an integral top bar, said bars being permanently connected at their extremities by pivots to said post and stationary bar on a common axis oblique to the longitudinal axis of the machine, a flexible stay connected to said top bar near its outer end and to the machine frame and serving to limit the backward movement of the movable corner of the shield frame and a flexible cover attached along its edges to the top and side bars of the movable stretcher.

In testimony whereof I affix my signature in presence of two witnesses.

FRED A. LAWTON.

Witnesses:
EMMA W. LAWTON,
LESTER L. LAWTON.

---

Copies of this patent may be obtained for five cents each, by addressing the "Commissioner of Patents, Washington, D. C."